US010503845B2

United States Patent
Stomakhin et al.

(10) Patent No.: US 10,503,845 B2
(45) Date of Patent: Dec. 10, 2019

(54) PARTICLE-IN-CELL METHODS PRESERVING SHEARING AND ROTATION

(71) Applicant: Disney Enterprises, Inc., Burbank, CA (US)

(72) Inventors: Alexey Stomakhin, Studio City, CA (US); Joseph Teran, Los Angeles, CA (US)

(73) Assignee: Disney Enterprises, Inc., Burbank, CA (US)

( * ) Notice: Subject to any disclaimer, the term of this patent is extended or adjusted under 35 U.S.C. 154(b) by 613 days.

(21) Appl. No.: 14/981,309

(22) Filed: Dec. 28, 2015

(65) Prior Publication Data
US 2017/0185701 A1    Jun. 29, 2017

(51) Int. Cl.
*G06F 17/50* (2006.01)
*G06F 17/10* (2006.01)

(52) U.S. Cl.
CPC .......... *G06F 17/5009* (2013.01); *G06F 17/10* (2013.01); *G06F 2217/16* (2013.01)

(58) Field of Classification Search
CPC ... G06F 17/5009; G06F 17/10; G06F 2217/16
See application file for complete search history.

(56) References Cited

U.S. PATENT DOCUMENTS

| | | | | |
|---|---|---|---|---|
| 2009/0312994 A1* | 12/2009 | Hughes | ............... | G06F 17/5009 703/6 |
| 2010/0030534 A1* | 2/2010 | Reich | .................. | G06F 17/5009 703/2 |
| 2011/0202327 A1* | 8/2011 | Yu | ...................... | G06F 17/5018 703/9 |
| 2012/0065947 A1* | 3/2012 | Yu | ...................... | G06F 17/5018 703/2 |

(Continued)

OTHER PUBLICATIONS

Ingo O. Götze, Hiroshi Noguchi, and Gerhard Gompper; Relevance of angular momentum conservation in mesoscale hydrodynamics simulations; 2007; 9 pages (Year: 2007).*

(Continued)

*Primary Examiner* — S. Sough
*Assistant Examiner* — Kimberly L Jordan
(74) *Attorney, Agent, or Firm* — Patterson + Sheridan, LLP

(57) ABSTRACT

The disclosure provides an approach for reducing information loss when transferring from particles to grid and vice versa in a hybrid Lagrangian/Eulerian simulation, while also preserving stability. In one aspect, referred to as the rigid particle-in-cell (RPIC) method, a simulation application stores a sampling of local angular momentum for each particle, helping to preserve the angular momentum that would otherwise be lost in the transfer from grid to particles. In another aspect that is more generally applicable and referred to herein as the rigid and shearing particle-in-cell (Continued)

(RSPIC) method, the simulation application stores, for each particle, a matrix with rotational and shearing information. The RSPIC method effectively reduces dissipation, preserves angular momentum exactly, and prevents instabilities. Further, the RSPIC method is applicable to both incompressible liquids and material point method (MPM) simulations of materials such as solids.

20 Claims, 6 Drawing Sheets
(3 of 6 Drawing Sheet(s) Filed in Color)

(56) References Cited

U.S. PATENT DOCUMENTS

| | | | | |
|---|---|---|---|---|
| 2016/0210384 | A1* | 7/2016 | Stomakhin | G06F 17/5009 |
| 2016/0307359 | A1* | 10/2016 | Desbrun | G06F 17/5009 |

OTHER PUBLICATIONS

Jiang et al., "The Affine Particle-In-Cell Method", ACM Transactions on Graphics (TOG)—Proceedings of ACM SIGGRAPH 2015 vol. 34, Issue 4, Aug. 2015, New York, USA.
Ando et al., "Highly Adaptive Liquid Simulations on Tetrahedral Meshes", ACM Transactions on Graphics (TOG)—SIGGRAPH 2013 Conference Proceedings, Jul. 2013, vol. 32, Issue 4, New York, USA.
Edwards et al., "Detailed water with coarse grids: combining surface meshes and adaptive discontinuous galerkin", ACM Trans Graph, vol. 33, 4, 2014, pp. 136:1-139:1.
Enright et al., "Animation and rendering of complex water surfaces", ACM Trans Graph vol. 21, 3, 2002, pp. 736-744.
Feldman et al., "Animating suspended particle explosions", ACM SIGGRAPH 2003, San Diego, Jul. 27-31, pp. 708-715.
Gerszewski, et al., "Physics-based animation of large-scale splashing liquids" ACM SIGGRAPH Asia, 2013. vol. 32, No. 6, pp. 185:1-185:6.
Harlow et al., "Numerical calculation of time dependent viscous flow of fluid with a free surface", Phys Fluid 8, 12, 2013, pp. 2182-2189.
Hong, et al., "Bubbles alive", ACM Trans Graph 27, 3, 2008, pp. 48:1-48:4.
Hong, W. et al., "Adaptive particles for incompressible particle-based fluid", Vis Comp 24, 7, 2008, pp. 535-543.
Hong, W. et al., "An adaptive sampling approach to incompressible particle-based fluid", Theory Pract Comp Graph, 2009, pp. 69-76.
Lee, et al., "Interchangeable sph and level set method in multiphase fluids", Vis Comp 25, 5, 2009, pp. 713-718.
Losasso, et al., "Two-way coupled sph and particle level set fluid simulation", IEEE Trans Vis Comp Graph 14, 2008, pp. 797-804.
Sifakis, et al., "Hybrid simulation of deformable solids", In Proc ACM SIGGRAPH/ Eurograph Symp Anim,2007, pp. 81-90.
Sin, et al., "A point-based method for animating incompressible flow", In Proc ACM SIGGRAPH/ Eurograph Symp Comp Anim, 2009, pp. 247-255.
Stomakhin, et al., 2013. "A material point method for snow simulation", ACM Trans Graph 33, 4, 2013, pp. 102:1-102:10.
Stomakhin, et al., "Augmented mpm for phasechange and varied materials" ACM Trans Graph 33, 4, 2013, pp. 138:1-138:11.
Yabe, et al., "The constrained interpolation profile method for multiphase analysis", J Comp Phys 169, 2001,pp. 556-593.
Zhu, et al., "Animating sand as a fluid", ACM Trans Graph 24, 3, 2005, pp. 965-972.
Zhu, et al., "Creating and preserving vortical details in sph fluid", Comp Graph Forum 29, 7, 2010, pp. 2207-2214.
Ando et al., "A Particle-based Method for Preserving Fluid Sheets", Eurographics/ACM SIGGRAPH Symposium on Computer Animation (2011), 10 pages.
Um, et al., "Advanced hybrid particle grid method with sub-grid particle correction", Comp Graph Forum 33, 2014, pp. 209-218. [Abstract Only].
Ando et al., "Preserving Fluid Sheets with Adaptively Sampled Anisotropic Particles", IEEE Transactions on Visualization and Computer Graphics, Mar. 19, 2012, pp. 1202-1214, vol. 18, Issue 8, IEEE.
Bargteil et al., "A Finite Element Method for Animating Large Viscoplastic Flow", ACM Transactions on Graphics SIGGRAPH 2007, Jul. 2007, vol. 26, Issue 3, New York, USA.
Batty et al., "Accurate Viscous Free Surfaces for Buckling, Coiling, and Rotating Liquids", Eurographics/ACM Siggraph Symposium on Computer Animation (2008), 10 pages.
Batty et al., "A Fast Variational Framework for Accurate Solid-Fluid Coupling", ACM Transactions on Graphics (TOG)—Proceedings of ACM SIGGRAPH 2007, Jul. 2007, vol. 26, Issue 3, New York, USA.
Brackbill et al., "FLIP: A Low-Dissipation, Particle-In-Cell Method for Fluid Flow", Computer Physics Communications, vol. 48, Issue 1, pp. 25-38, Los Alamos, USA, [Abstract Only].
Brackbill et al., "The ringing instability in particle-in-cell calculations of low-speed flow", Journal of Computational Physics, Apr. 1988, vol. 75, Issue 2, pp. 469-492, San Diego, USA. [Abstract Only].
Chentanez et al., "Real-time Simulation of Large Bodies of Water with Small Scale Details", Eurographics/ACM SIGGRAPH Symposium on Computer Animation (2010), 11 pages.
Chentanez et al., "Real-Time Eulerian Water Simulation Using a Restricted Tall Cell Grid", ACM Transactions on Graphics (TOG)—Proceedings of ACM SIGGRAPH 2011, vol. 30, Issue 4, Jul. 2011, New York, USA.
Chentanez et al., "Coupling 3D Eulerian, Heightfield and Particle Methods for Interactive Simulation of Large Scale Liquid Phenomena", IEEE Trans Vis Comput Graph. Oct. 2015;21(10):1116-28 [Abstract Only].
Cornelis, et al., "lisph-flip for incompressible fluids", Eurographoics 2014, pp. 1-8 . [Abstract Only].
Edwards et al., "A high-order accurate particle-in-cell method", Int J Numer Meth Eng 90, 2012, pp. 1073-1088.
Foster et al., "Realistic animation of liquids" Center for Human Modeling and Simulation, University of Pennsylvania, pp. 471-483. Jun. 3, 1996.
Gao, et al., "Simulating gaseous fluids with low and high speeds", Pacific Graphics, 2009, pp. 1845-1852.[Abstract Only].
Ihmsen, et al., "Implicit incompressible" 2013, IEEE Trans Vis Comp Graph 20, 3, 2013, pp. 426-435. [Abstract Only].
Love, et al., "An unconditionally stable, energy-momentum consistent implementation of the the material point method" Comp Meth App Mech Eng 195, 2006, pp. 3903-3925. [Abstract Only].
Mihalef, et al., "Textured liquids based on the marker level set", EUROGRAPHICS 2007, vol. 26 (2007), No. 3, 9 pages.
Muller, et al., "Smoothed dissipative particle dynamics with angular momentum conservation", J Comp Phys 281, 2015, pp. 301-315. [Abstract Only].
Narain, et al., "Free-flowing granular materials with two-way solid coupling" ACM Trans Graph 29, 6, 2013, pp. 173:1-173:10.
Patkar, et al., "A hybrid lagrangian-eulerian formulation for bubble generation and dynamics", In Proc ACM SIGGRAPH/Eurograp Symp Comp Anim, SCA 2013, pp. 105-114.
Raveendran, et al., "Hybrid Smoothed Particle Hydrodymanics" ACM SIGGRAPH/Eurograp Symp Comp Anim, SCA, 2011, pp. 33-42. [Abstract Only].
Song, et al., . Derivative particles for simulating detailed movements of fluids. IEEE Trans Vis Comp Graph, 2009. pp. 247-255. [Abstract Only].
Sulsky, et al., "Application of a pic method to solid mechanics", Comp Phys Comm 87, 1, 1995, pp. 236-252. [Abstract Only].
Boyd et al., "MultiFLIP for Energetic Two-Phase Fluid Simulation", ACM Transactions on Graphics (TOG), Apr. 2012, vol. 31, Issue 2, 12 pages, New York, USA.

(56) References Cited

OTHER PUBLICATIONS

Brackbill et al., "FLIP: A method for adaptively zoned, particle-in-cell calculations of fluid flows in two dimensions", Journal of Computational Physics, Aug. 1986, vol. 65, Issue 2, pp. 314-343, San Diego, USA.

Kim, J. et al., "Practical Animation of Turbulent Splashing Water", in Proc ACM SIGGRAPH/Eurograph Symp. Comp. Anim, SCA '06, 2006, pp. 335-344.

* cited by examiner

PARTICLE-IN-CELL METHODS PRESERVING SHEARING AND ROTATION

BACKGROUND

Field of the Invention

This disclosure provides techniques for computer simulation and rendering of phenomena. More specifically, one aspect of this disclosure presents particle-in-cell methods for the computer simulation and rendering that preserve shearing and rotation.

Description of the Related Art

Hybrid Lagrangian/Eulerian methods, in which particle and grid formulations are used in conjunction to simulate fluids and other materials undergoing large deformation, are commonplace in computer graphics simulations. However, traditional hybrid Lagriangian/Eulerian methods suffer from inherent and well-known limitations, such as unwanted dissipation of angular momentum, or noisiness and instability.

SUMMARY

One aspect of this disclosure provides a computer-implemented method of simulating a system. The method generally includes, for one or more iterations: transferring system information including angular momentum information from particles to a grid on which dynamics are computed, and transferring the system information including the angular momentum information and velocity information back from the grid to the particles on which at least velocity changes are computed, where the transfer from the particles to the grid and the transfer back from the grid to the particles act as filters and conserve angular momentum. In another aspect, the system information that is transferred from the particles to the grid and back from the grid to the particles further includes shearing information.

Further aspects include a non-transitory computer-readable storage medium storing instructions that when executed by a computer system cause the computer system to perform the methods set forth above, and computer systems programmed to carry out the methods set forth above.

BRIEF DESCRIPTION OF THE DRAWINGS

This patent or application file contains at least one drawing executed in color. Copies of this patent or patent application publication with color drawing(s) will be provided by the Office upon request and payment of the necessary fee.

So that the manner in which the above recited aspects are attained and can be understood in detail, a more particular description of aspects of this disclosure, briefly summarized above, may be had by reference to the appended drawings.

It is to be noted, however, that the appended drawings illustrate only typical aspects and are therefore not to be considered limiting of its scope, for the invention may admit to other equally effective aspects.

Figure 1:
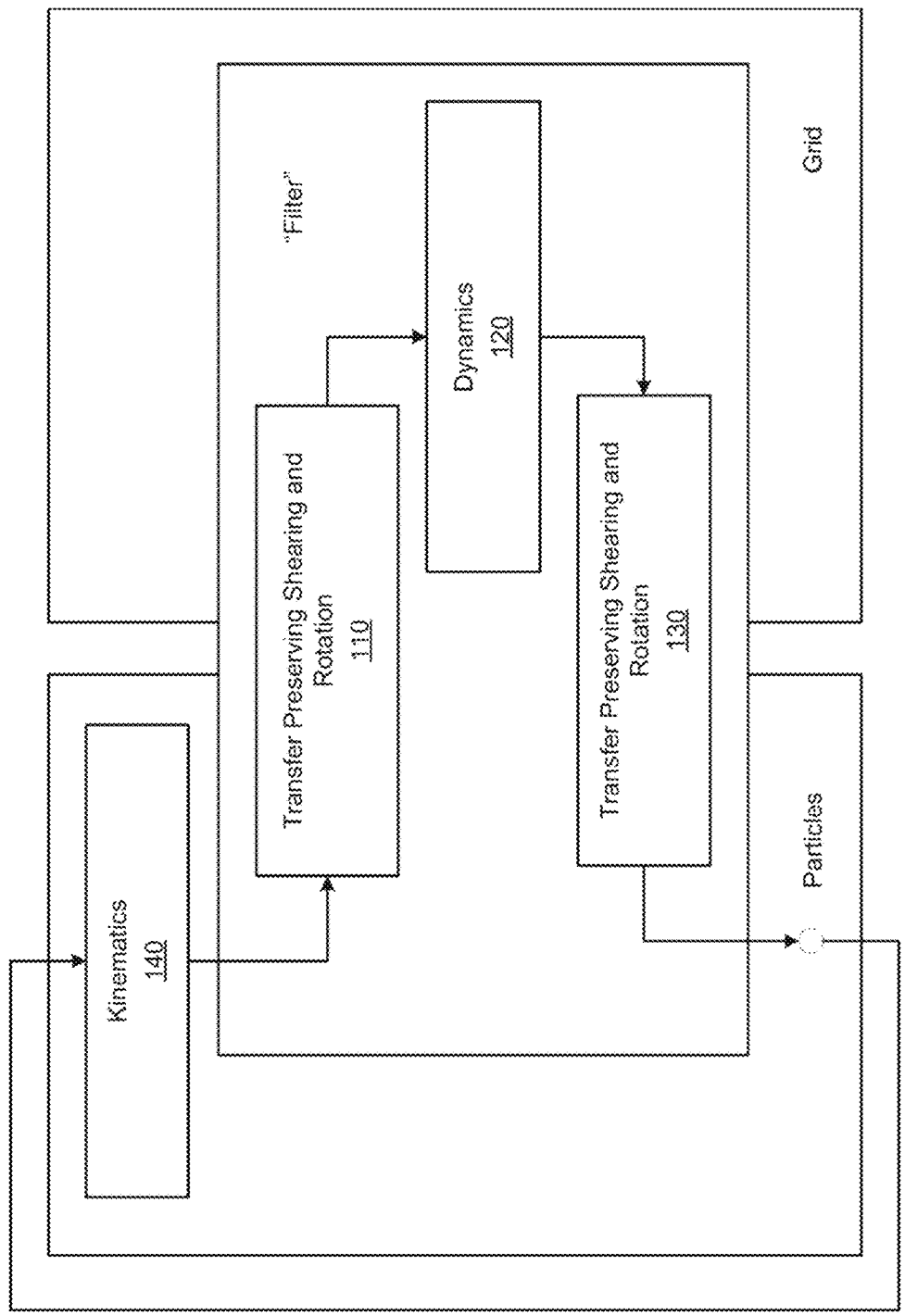

FIG. 1 illustrates an approach for simulating a system, according to an aspect of this disclosure.

Figure 2:
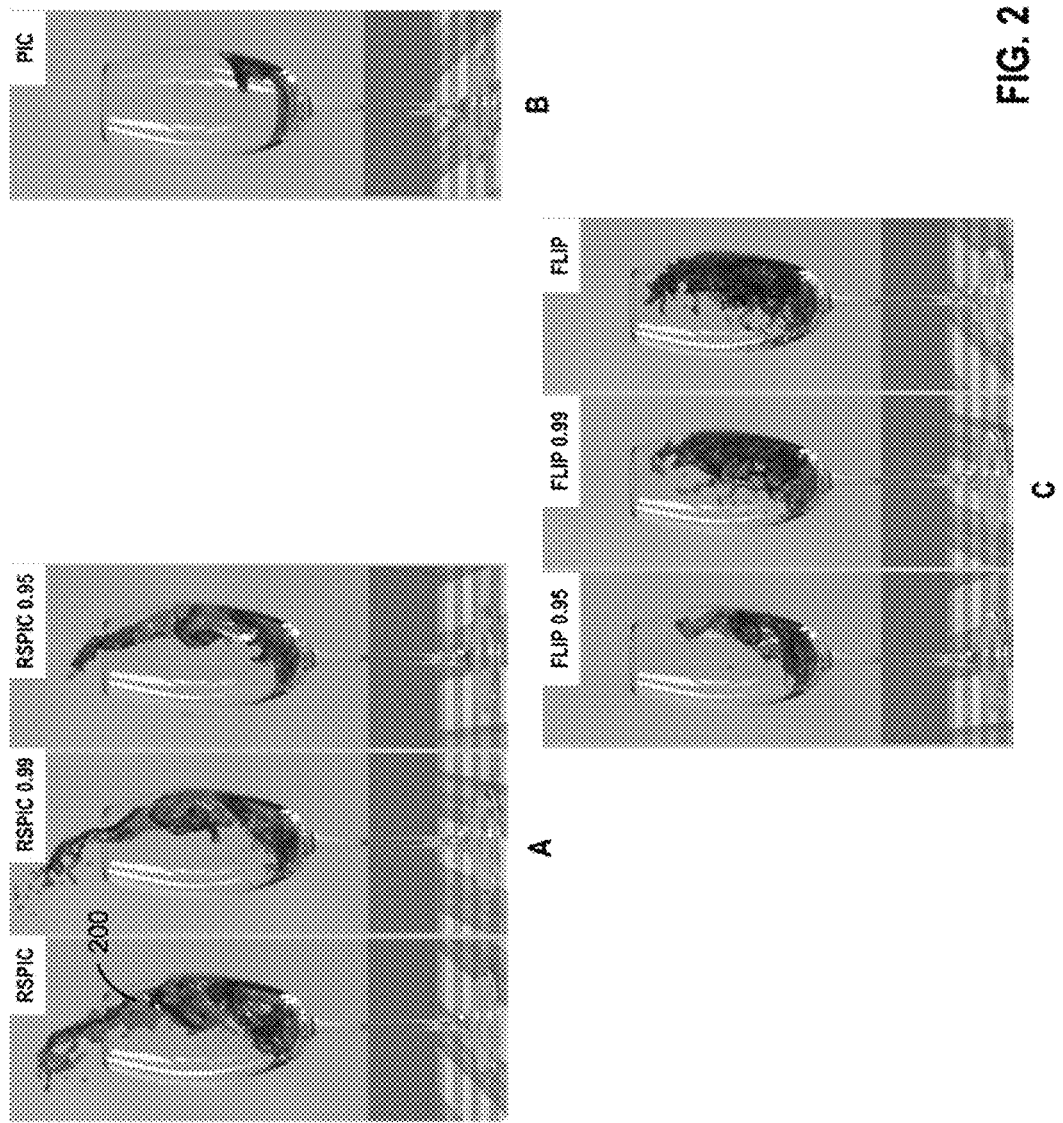

FIG. 2 illustrates an example of a simulation using a particle-in-cell method preserving shearing and rotation compared to traditional techniques, according to an aspect of this disclosure.

Figure 3:
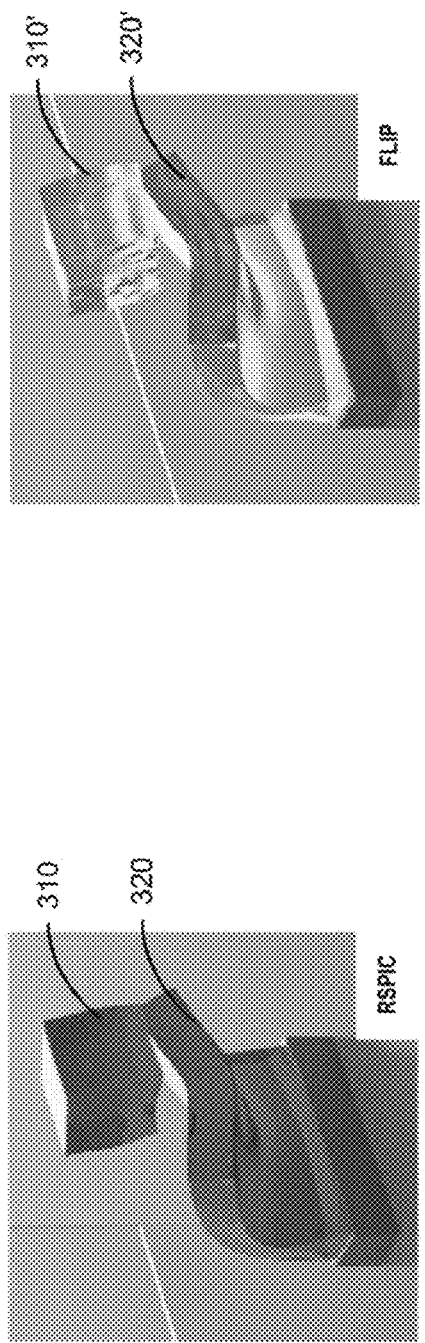
Figure 3:
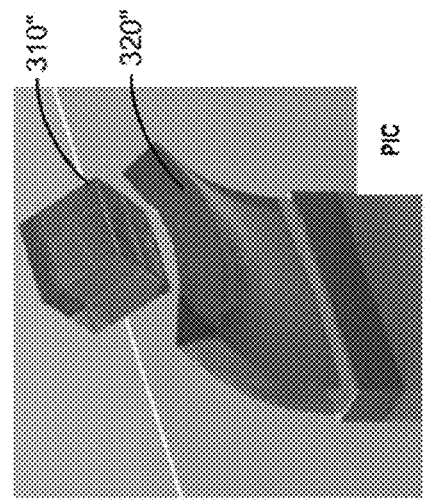

FIG. 3 illustrates a second example of a simulation using the particle-in-cell method preserving shearing and rotation compared to traditional techniques, according to an aspect of this disclosure.

Figure 4:
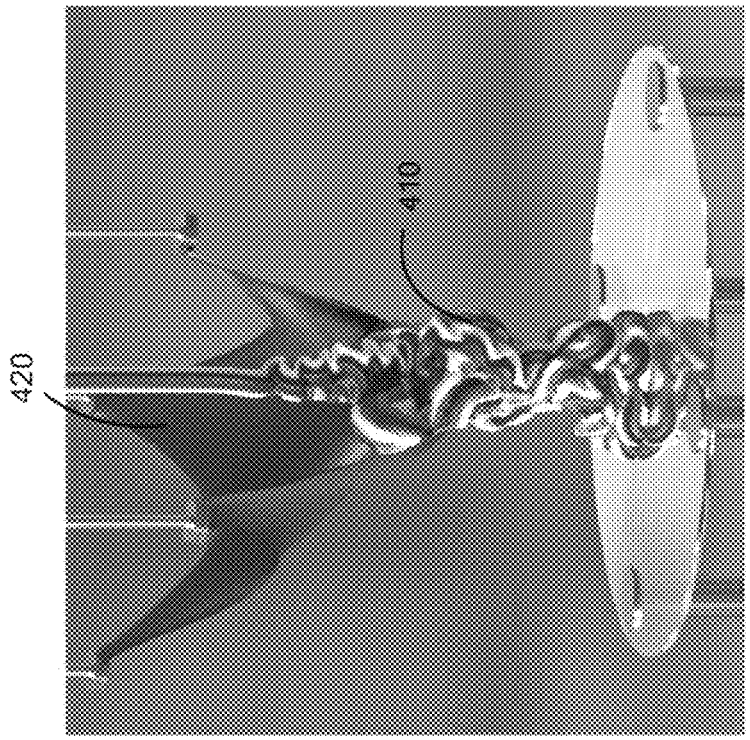
Figure 4:
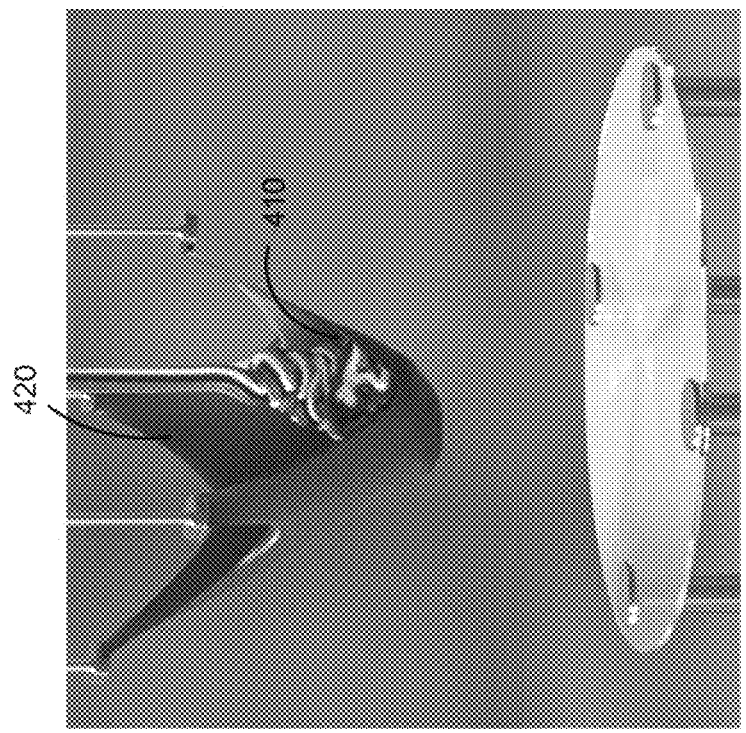

FIG. 4 illustrates a third example of a simulation using the particle-in-cell method preserving shearing and rotation compared to traditional techniques, according to an aspect of this disclosure.

Figure 5:
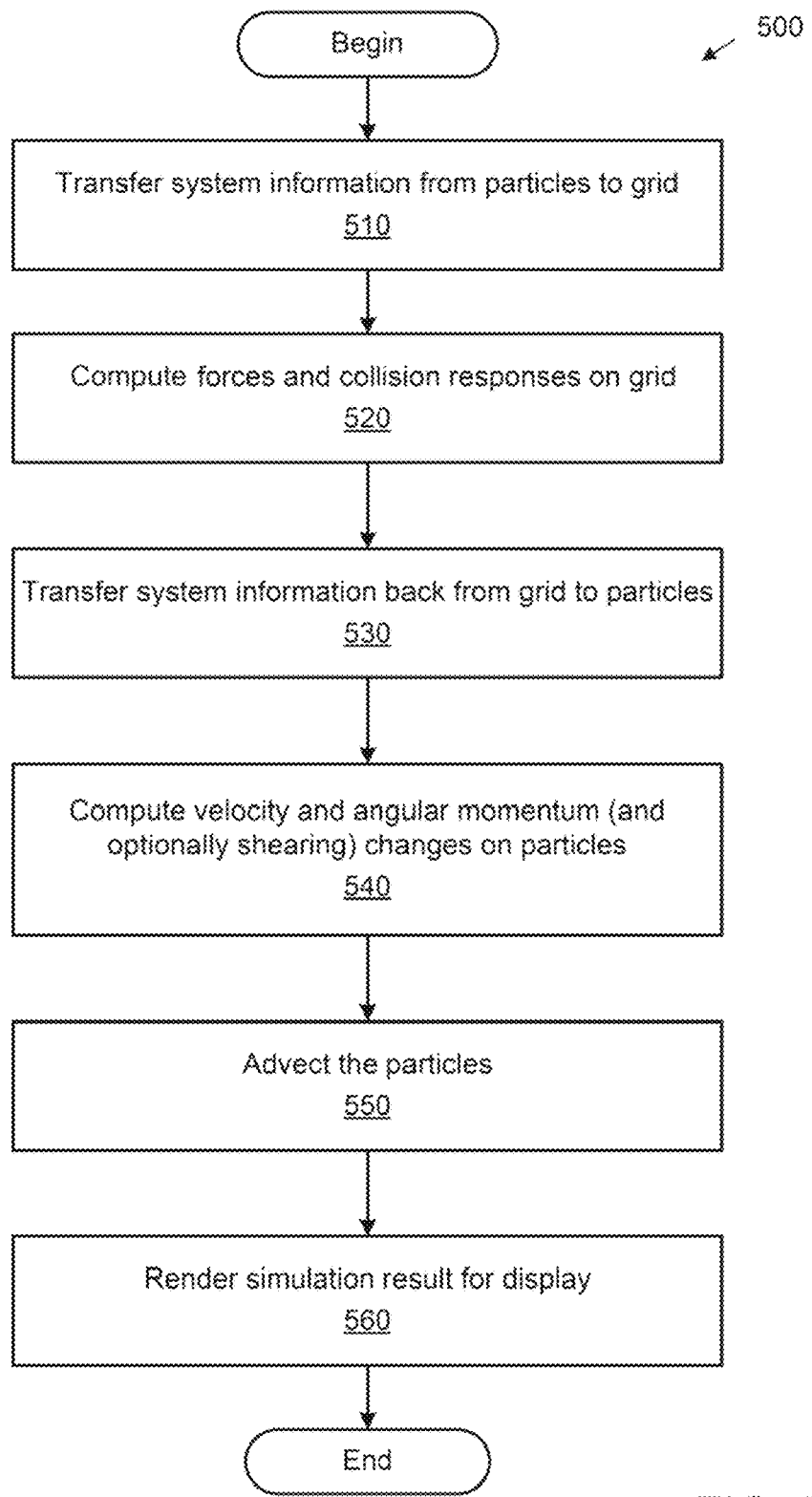

FIG. 5 illustrates a method for simulating a system, according to an aspect of this disclosure.

Figure 6:
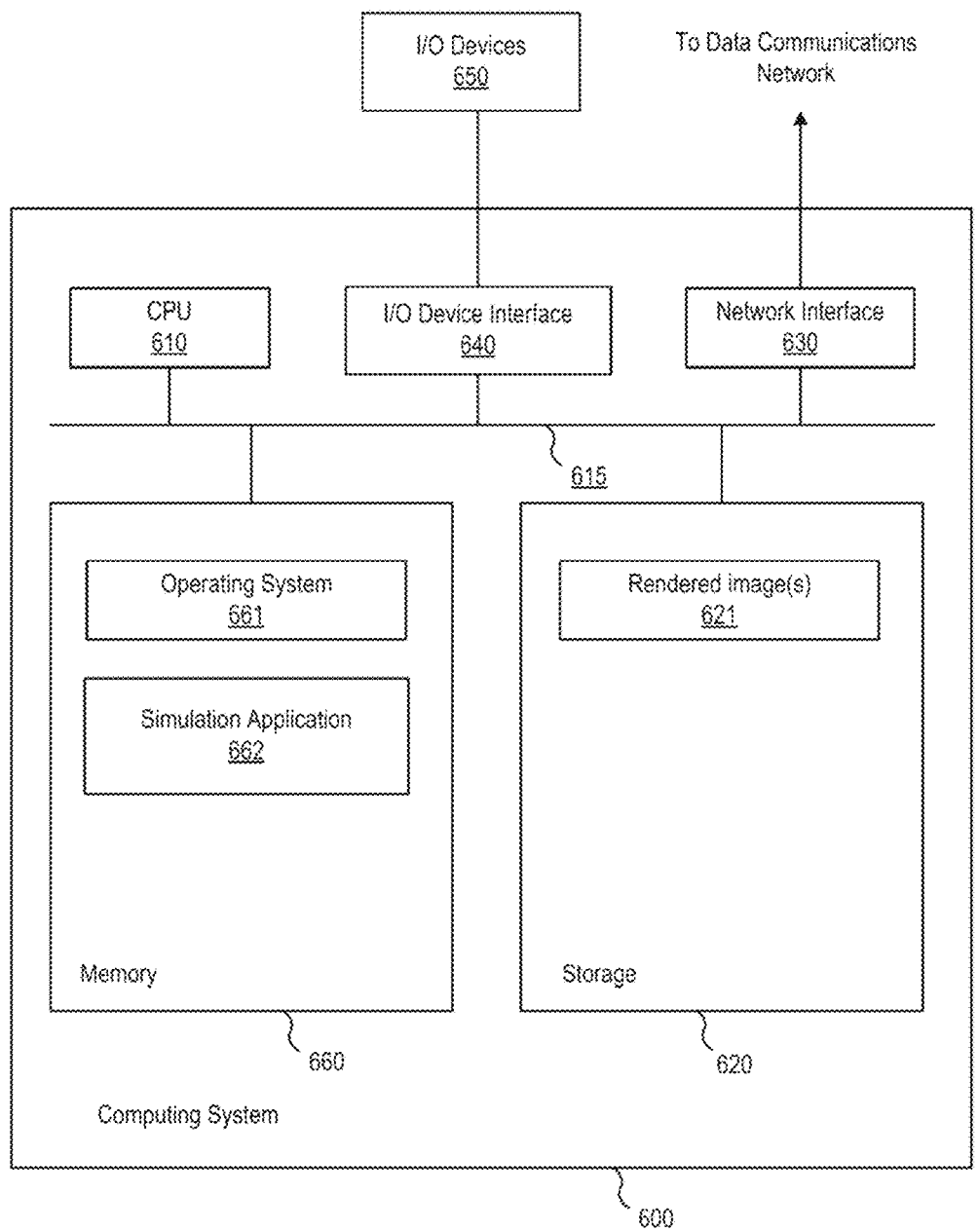

FIG. 6 illustrates a computer system in which an aspect of this disclosure may be implemented.

To facilitate understanding, identical reference numerals have been used, where possible, to designate identical elements that are common to the figures. It is contemplated that elements and features of one aspect may be beneficially incorporated in other aspects without further recitation

DETAILED DESCRIPTION

This disclosure provides techniques which reduce information loss when transferring from particles to grid and vice versa in a hybrid Lagrangian/Eulerian simulation, while also preserving stability in the simulation. That is, techniques disclosed herein retain the stability of the original particle-in-cell (PIC) method without the dissipation inherent in the PIC method or the noise and instability of the fluid implicit particle (FLIP) method. Traditionally, a single particle receives data from multiple grid points but is forced to reduce those influences to a single constant value, and this leads to loss of information (e.g., dissipation). Two methods are introduced herein to avoid such loss of information. In one aspect, referred to herein as the rigid particle-in-cell (RPIC) method, a simulation application stores a sampling of local angular momentum for each particle, preserving the angular momentum that would otherwise be lost in the transfer from grid to particles. That is, RPIC augments each particle with the angular momentum lost in the grid to particle transfer. RPIC may be applied, for example, in rigid body simulations. In another aspect that is more generally applicable and referred to herein as the rigid and shearing particle-in-cell (RSPIC) method, the simulation application stores, for each particle, a matrix with rotational (angular momentum) and shearing components. In this manner, angular momentum and shearing modes are all preserved. Further, noise/instabilities are controlled by keeping the pure filter property of the PIC method. The RSPIC method effectively reduces dissipation, preserves angular momentum exactly, and prevents instabilities. Furthermore, the RSPIC method is applicable to both incompressible liquids and material point method (MPM) simulations of materials such as solids.

FIG. 1 illustrates an approach for simulating a system, according to an aspect of this disclosure. The system may generally be any physical systems such as water, granular materials, snow, sand, solid materials, and the like. As shown, during each iteration of the simulation 100, the simulation application first transfers system information which is stored for particles to a grid at 110. As used herein, "system information" refers to information that describes the physical (mechanical) system to be simulated, such as masses and velocities (which are transferred between the grid and the particles), or any other kind of information for which the definitions of angular momentum and shearing make sense. As discussed in greater detail below, the information stored for each particle may include angular momentum in the case of the RPIC method, and, in the case of the RSPIC method, a matrix with both rotational and non-rigid motion information such as shearing information. The RSPIC method in particular is shown and includes transferring the rotational and non-rotational information to the grid.

Thereafter, at 120, dynamics, such as force computations and collision responses, are computed on the grid. Then at 130, the system information is transferred back to the particles, and velocity changes and updated matrices (or angular momentum changes in the case of RPIC) may be computed on the particles at 140, which is followed by the kinematics update. That is, the particles are used to resolve transport and topological change, while the background Eulerian grid is used for computing mechanical forces and collision responses. The transfer, both from particles to grid and back, is a filter transfer. This means that when transferring information from representation A to representation B, only the information provided by A is used, which ensures stability of the method. This is in contrast with FLIP, where when transferring information from grid to particles, both the grid information and the information from particles from the beginning of the timestep is used.

As discussed, PIC and FLIP have proven useful, but suffer inherent limitations. For example, the traditional PIC method is stable, but highly dissipative, resulting in the loss of angular momentum as information is lost during transfers from particles to grid and back. This produces rotation artifacts as, e.g., objects in free fall stop rotating as if under the action of a viscous fluid drag. The FLIP method was designed to remove this dissipation by transferring increments of velocities and displacements from grid to particles, rather than directly interpolating from the grid. Intuitively, if there is only a small offset, only a small correction will be made, typically reducing the dissipation. However, this makes FLIP suffer greatly from so-called "ringing instability" in which there are more particles than grid nodes and some particle modes are not seen by the grid and get no physical response. Ringing instability also exists in PIC but is more pronounced in FLIP because, in PIC, particle-to-grid transfer followed by grid-to-particle transfer is a true filtering of the instability. However, while PIC forces all information through the grid, FLIP preserves some particle information which allows the instability to persist and grow unpredictably over multiple time steps. In FLIP simulations, these instabilities can lead to practical particle positional artifacts such as noise, clumping, and volume change.

Some have also advocated blending the PIC and FLIP methods to stabilize the simulator. However, this re-introduces the dissipation of PIC and may require manual tuning of the blend weights on a case-by-case basis. There is then the difficult choice of biasing the simulation toward PIC to avoid instability at the expense of dissipation, or biasing the simulation toward FLIP to produce more lively simulations at the expense of noise and possible unstable behavior.

The notation used herein is summarized in Table 1. Subscripts p and q are used to refer to particles, and subscripts i and j are used to refer to regular grid indices. When dealing with MAC grids, the subscript a refers to an axis direction ($e_a$, where $a \in \{1, 2, 3\}$ in 3D), and faces are referred to by cell index and axis ($m_{ai}^n$). The subscript distinguishes quantities available or computed at the beginning of the time step ($v_p^n$) from quantities that are computed for use at the beginning of the next time step ($v_p^{n+1}$). Lowercase bold is used for vectors ($v_p^n$), and uppercase bold is used for matrices ($K_p^n$), with the exception of angular momentum, a vector quantity that is denoted by $L_p^n$. In Table 1, locations are denoted by p (particle), n (regular grid node), f (MAC face center), or g (global; does not live at any location in space), while quantities are of type s (scalar), v (vector), m (matrix), or t (rank-3 tensor).

TABLE 1

| Symbol | Location | Type | Meaning |
| --- | --- | --- | --- |
| $m_p$ | p | s | mass |
| $x_p^n$ | p | v | position |
| $v_p^n$ | p | v | velocity |
| $F_p$ | p | m | deformation gradient |
| $f_p$ | p | v | force |
| $\omega_p^n$ | p | v | angular velocity |
| $L_p^n$ | p | v | angular momentum |
| $K_p^n$ | p | m | inertia tensor |
| $m_i^n$ | n | s | mass |
| $x_i$ | n | v | position |
| $v_i^n$ | n | v | velocity |
| $\tilde{v}_i^{n+1}$ | n | v | intermediate velocity |
| $f_i$ | n | v | force |
| $w_{ip}^n$ | n + p | s | weights |
| $m_{ai}^n$ | f | s | mass |
| $x_{ai}$ | f | v | position |
| $w_{aip}^n$ | f + p | s | weights |
| $\Phi$ | g | s | total potential energy |
| $L_{tot}^{P,n}$ | g | v | total particle angular momentum |
| $L_{tot}^{G,n}$ | g | v | total grid angular momentum |
| $N(x)$ | g | s | interpolation kernel |
| $e_a$ | g | v | axis vector |

The standard PIC method for fluid simulation does pressure and velocity updates on an Eulerian grid and advection with Lagrangian particles. PIC stores mass $m_p$, position $x_p^n$, and velocity $v_p^n$. Mass $m_p$ lacks a time n subscript, as mass does not change to ensure conservation of mass. Each time step in the PIC method begins with a transfer of mass and momentum from particles to a collocated grid according to $$m_i^n = \Sigma_p w_{ip}^n m_p, \quad m_i^n v_i^n = \Sigma_p w_{ip}^n m_p v_p^n, \quad (1)$$

where $w_{ip}^n = N(x_p^n - x_i)$ are interpolation weights and $x_i$ denote the regular Cartesian grid node locations. The transfer from particles to grid is a prefilter to the grid dynamics. With mass and momentum on the grid, forces can be applied to the velocities in a grid-based updated, $v_i^n \to \tilde{v}_i^{n+1}$. $\tilde{v}_i^{n+1}$ is used here rather than $v_i^{n+1}$ to distinguish from $v_i^n$ at the next time step. After the velocities are computed on the grid, velocity is transferred back to the particles with $$v_p^{n+1} = \Sigma_i w_{ip}^n \tilde{v}_i^{n+1}. \quad (2)$$

One major problem with the traditional PIC method is it uses a basic kernel to transfer information that smooths out data and results in severely damped rotational motion. For example, water simulated with PIC may appear very viscous. Consider the angular momentum conservation properties in the transfers of the PIC method. Linear momentum is conserved by both transfers, discussed above, and total angular momentum over the particles and grid at time $t^n$ are given by $$L_{tot}^{P,n} = \Sigma_p x_p^n \times m_p v_p^n, \quad L_{tot}^{G,n} = \Sigma_i x_i \times m_i^n v_i^n. \quad (3)$$

While the transfer from particles to the grid conserves angular momentum, the transfer from the grid back to particles does not. This loss of angular momentum manifests as rotational motion damping.

Stated another way, in traditional PIC, particles are splat on the grid during transfer such that if a particle has a given velocity, nearby nodes on grid will get the same velocity. Nodes of the grid may get velocities from different particles, and such velocities are averaged. Another averaging is performed to transfer back from grid to particle in an interpolation operation in which each particle considers which grid nodes are affecting it and averages their contributions. Under this approach, linear velocity is preserved, but rotations are lost. As a result, vortices that are formed in substances such as water are destroyed, and damping is observed.

One aspect of this disclosure, the RPIC method, reduces information loss when transferring from particles to a grid and vice versa by modifying the PIC method transfer to facilitate conservation of angular momentum in the grid to particle transfer. Doing so guarantees that flows can be rotational without the damping behavior of PIC. Consider the case of a single particle. PIC typically transfers information to multiple grid locations since $w_{ip}^n$ is generally non-zero for a few grid nodes at a time. Even for a single particle of material, the particle's corresponding representation on the grid is capable of storing angular momentum (by virtue of consisting of multiple grid nodes). However, one particle in the PIC method is incapable of representing angular momentum. In the RPIC method, a simulation application additionally stores a sample of local angular momentum Lion each particle to improve the compatibility of the particle representation with the grid representation. In such a case, even for a single particle, loss of angular momentum can be prevented when transferred from grid to particle. That is, an extra rotation vector is stored for each particle so that angular momentum is preserved rather than lost during transfer.

Mathematically, the angular momentum that would be lost in the transfer from grid to particles is $$L_p^{n+1} = \Sigma_i w_{ip}^n (x_i - x_p^n) \times m_p \tilde{v}_i^{n+1}. \quad (4)$$

With this definition, the total angular momentum on particles becomes $$L_{tot}^{P,n} = \Sigma_p (x_p^n \times m_p v_p^n + L_p^n). \quad (5)$$

In addition, the transfer from grid to particles trivially conserves angular momentum. As to the transfer from particles to grid, if the particles are considered as rigid bodies with inertia tensors $K_p^n$, then the angular velocity may be defined as $\omega_p^n = (K_p^n)^{-1} L_p^n$. The rigid body's local velocity at a grid node is $v_p^n + \omega_p^n \times (x_i - x_p^n)$, and one transfer that may be used is $$m_i^n v_i^n = \Sigma_p w_{ip}^n m_p (v_p^n + ((K_p^n)^{-1} L_p^n) \times (x_i - x_p^n)). \quad (6)$$

This transfer may be imagined as distributing the masses $w_{ip}^n m_p$ from the rigid body to the grid node i. In addition, the rigid body's inertia tensor may be $$K_p^n = \Sigma_j w_{jp}^n m_p (x_j - x_p^n)^* (x_j - x_p^n)^{*T}, \quad (7)$$

where v* is the cross product associated with vector v. It can be shown that performing the transfer from particles to grid in this manner conserves angular momentum.

Another aspect of this disclosure, the RSPIC method that is shown in FIG. 1, reduces information loss when transferring from particles to a grid and vice versa by modifying the PIC method to store at least shearing of the velocity field in addition to the angular momentum. For example, an additional matrix per particle may include six numbers representing the shearing information. It should be understood that, in other aspects, the six numbers may be stored without use of a matrix, or combined together with the rotational or other information. While the RPIC method discussed above introduces a piecewise rigid formulation that corrects rotational artifacts arising from loss of angular momentum in the traditional PIC method, RPIC may still damp out non-rigid motions that often occurs in fluids. RSPIC extends the idea of enriching the velocity representation to also handle shearing modes.

FIG. 2 illustrates an example of a simulation using the RSPIC method compared to traditional techniques, according to an aspect of this disclosure. As shown in panel A, a simulation using the RSPIC method of wine in glass 200 and a blend of RSPIC and PIC yields more energetic and stable behavior than the pure PIC simulation in panel B, which has damping, and the FLIP simulation and blends of FLIP and PIC in panel C, which tends to be unstable. RSPIC/PIC blends may be achieved by scaling the particle matrices. To apply the RSPIC method to marker-and-cell (MAC) based fluid simulations, one aspect of this disclosure uses a set of transfers between particles and MAC faces.

FIG. 3 illustrates a second example of a simulation using the RSPIC method compared to traditional techniques, according to an aspect of this disclosure. In this aspect, a novel model for MPM force computations using Lagrangian forces, discussed in greater detail below, is introduced. This approach of using Lagrangian forces is independent of grid-particle transfers and also works with traditional PIC/FLIP based MPM. However, it should be understood that FLIP and FLIP/PIC mixtures do not tend to produce plausible looking and stable results due to the instability of FLIP, while PIC itself is also not particularly useful by itself, as discussed above.

Panel A shows an RSPIC simulation using a Lagrangian force model in which a cube 310 collides with a flexible block 320. As shown, the cube 310 surface remains smooth after collision relative to the behavior of a FLIP simulation shown in panel B in which a similar cube 310' collides with a flexible block 320'. The same simulation using PIC and its attendant dampening is shown in panel C. The RSPIC method preserves angular momentum and energetic behavior better than PIC, FLIP, and FLIP/PIC blends. Further, FLIP and FLIP/PIC blends may produce ringing instability during the collision between the cube 310' and the block 320', which the RSPIC method does not.

In one aspect, the simulation application may apply any Lagrangian force model (springs, finite elements, etc.) for which total potential energy $\Phi(x_p)$ can be written down. Corresponding to the Lagrangian force model, the simulation application computes forces $$f_p = -\frac{\partial \Phi}{\partial x_p}.$$

It is assumed that given any vector $\delta u_q$ on particles, $$\partial f_p = \sum_q \frac{\partial f_p}{\partial x_p} \partial u_q$$

can be obtained by multiplying by force derivatives. These force-related constructs are purely Lagrangian and may be computed in the traditional manner. The mesh-based Lagrangian forces may further be applied through the grid. This requires describing how particle positions $x_p$ relate to moving grid nodes $x_i$ so that forces can be evaluated. In addition, the simulation application needs to compute forces $f_i$ and $f_p$ and find a means of computing $\delta f_i$ given $\delta u_i$. Doing so allows the use of the Lagrangian forces as Eulerian forces. Comparing the updated rules for $x_p$ and $x_i$, it can be shown that $x_p = \Sigma_i w_{ip}^n x_i$. Then, using the chain rule, $$f_i = \sum_p w_{ip}^n f_p \qquad (8)$$

$$\partial f_i = \sum_{p,q,j} w_{ip}^n \frac{\partial f_p}{\partial x_p} w_{jq}^n \delta u_j.$$

Although this formula is written with three nested summations, the computations can be efficiently performed by computing the summations consecutively. As these forces are applied to the grid, both the MPM and Lagrangian approaches may be employed in the same simulation. In such a case, each particle may be labeled as an MPM particle or a meshed particle. Note that the deformation gradient $F_p^n$ stored on meshed particles is never used, as this quantity is computed using the mesh for the meshed particles, thereby providing an effective means of coupling MPM with mesh-based approaches. This gives the precise surface tracking of Lagrangian techniques coupled with the automatic collision handling of Eulerian grids.

As used herein, "coupling" refers to the interaction between materials in a simulation. For example, in the case of water pouring onto a piece of cloth, the water may be governed by Navier-Stokes equations while the cloth is governed by Newton's laws and strain. In such a case, the coupling in which the simulation application figures out how the solid (cloth) affects the fluid (water) and vice versa is traditionally very slow, as forces need to be transferred between two spaces frequently to simulate the interaction. In contrast, the Lagrangian forces approach discussed above may, for a solid, use exact distances (e.g., exact increments in spring deformation) to rasterize springs connecting particles to a grid, which can be naturally with the MPM approach in which the particles themselves are rasterized to the grid. This allows for seamless and efficient coupling between Lagrangian and MPM simulations.

FIG. 4 illustrates a third example simulation showing a coupling, according to an aspect of this disclosure. As shown, coupling is achieved using MPM with Lagrangian energy-based forces in an RSPIC simulation of elastoplastic frozen yogurt 410 falling on an elastic cloth 420. In this particular simulation, a traditional MPM discretization of an elastoplastic constitutive model is used to simulate the frozen yogurt 410. This is coupled with the elastic cloth 420 via a Lagrangian force model, and the cloth 420 in this example is modeling using mass-spring energy.

FIG. 5 illustrates a method 500 for simulating a system, according to an aspect of this disclosure. One iteration of the method 500 is shown for illustrative purposes, but it should be understood that an actual simulation may involve multiple iterations of one or more steps of the depicted method 500. For example, where the system represents a solid material, the method 500 may include steps in an MPM method loop. As another example, where the system represents a fluid, the method 500 may include steps in a loop similar to a PIC method loop, but with transfers from particle to grid that back that do not dissipate angular momentum, in the case of RPIC, or both angular momentum and shearing, in the case of RSPIC.

As shown, the method begins at step 510, where a simulation application transfers system information from particles to a grid. In an RPIC simulation, the system information may include angular momentum information, and a sample of local angular momentum may be stored on each particle. In an RSPIC simulation, the system information may further include shearing information that is stored in a matrix for each particle along with rotational information.

At step 520, the simulation application computes forces and collision responses on the grid. In one aspect, like other hybrid Lagrangian/Eulerian methods, the forces and collision responses may be computed in the traditional manner using the system information from the particles that are transferred to the grid. In another aspect, the simulation application may use Lagrangian forces, discussed above, to simulate, e.g., non-granular materials or sponges or mattresses with springs. Note, in order to use such Lagrangian forces, the transfer of system information from the particles to the grid must be a filter transfer, which it is in the RSPIC method.

At step 530, the simulation application transfers the system information back from the grid to the particles. In an RPIC simulation, the system information that is transferred back may include angular momentum information, and, in an RSPIC simulation, a transfer is used that transfers rotational information and shearing information back to the particles.

At step 540, the simulation application computes velocity changes and angular momentum and shearing (for RSPIC) or just angular momentum (for RPIC) changes on the particles. Then, at step 550, the simulation application advects the particles. Steps 540-550 may be performed in a similar manner as in the traditional PIC method. Thereafter, at step 560, the simulation results are rendered for display on a display screen. Although rendering is shown as being performed on the fly as simulation data computed for each timestep becomes available, it should be understood that rendering may instead (and usually) be done after the entire simulation is completed.

FIG. 6 depicts a block diagram of a computer system 600 in which an aspect of this disclosure may be implemented. As shown, the system 600 includes, without limitation, a central processing unit (CPU) 610, a network interface 630, an interconnect 615, a memory 660 and storage 620. The system 600 may also include an I/O device interface 640 connecting I/O devices 650 (e.g., keyboard, display and mouse devices) to the system 600.

The CPU 610 retrieves and executes programming instructions stored in the memory 660. Similarly, the CPU 610 stores and retrieves application data residing in the memory 660. The interconnect 615 facilitates transmission, such as of programming instructions and application data, between the CPU 610, I/O device interface 640, storage 620, network interface 630, and memory 660. CPU 510 is representative of one or more of a single CPU, multiple CPUs, a single CPU having multiple processing cores, one or more graphics processing units (GPUs), and the like. And the memory 660 is generally included to be representative of a random access memory. The storage 620 may be a disk drive storage device. Although shown as a single unit, the storage 620 may be a combination of fixed or removable storage devices, such as fixed disc drives, floppy disc drives, removable memory cards or optical storage, network attached storage (NAS), or a storage area-network (SAN). Further, system 600 is included to be representative of a physical computing system as well as virtual machine instances hosted on a set of underlying physical computing systems. Further still, although shown as a single computing system, one of ordinary skill in the art will recognized that the components of the system 600 shown in FIG. 6 may be distributed across multiple computing systems connected by a data communications network.

As shown, the memory 660 includes an operating system 661 and simulation application 662. Illustratively, the operating system 661 may include Microsoft's Windows®. The simulation application 662 is configured to perform RPIC and/or RSPIC simulations that reduce information loss when transferring from particles to grid and vice versa by storing and transferring rotational information in the case of RPIC and rotational and shearing information in the case of RSPIC. In one aspect, the simulation application 662 may transfer system information, including angular momentum (and shearing information for RSPIC simulations) from particles to a grid, compute forces on the grid, transfer the system information back from the grid to the particles, compute velocity changes and angular momentum (and shearing for RSPIC) changes on the particles, advect the particles, and render the simulation, according to the method 500 discussed above with respect to FIG. 5.

Although discussed herein primarily with respect to the RPIC and RSPIC methods being used alone, in alternative aspects, RPIC and RSPIC may be blended with the traditional PIC method. Such blends may be achieved analogously to how traditional FLIP and PIC are blended. For example, particle matrices may be scaled to blend the RSPIC and PIC methods to introduce back the damping effect from PIC.

Advantageously, techniques disclosed herein reduce information loss when transferring from particles to grid and vice versa, while preserving stability, in a hybrid Lagrangian/Eulerian simulation. In the RPIC method, rotational angular momentum information is stored for each particle, and in the RSPIC method, rotational and shearing information are stored for each particle in a matrix. Such information is transferred in a filter from particles to grid and then back to the particles, thereby conserving angular momentum and preventing the damping of rotational motion in the case of RPIC and, in the case of RSPIC, also preventing the damping of shearing motions. Doing so solves the damping problem inherent in traditional PIC simulations, while also avoiding the instabilities that can arise in FLIP simulations.

In the foregoing, reference is made to aspects of this disclosure. However, it should be understood that the invention is not limited to specific described aspects. Instead, any combination of the foregoing features and elements, whether related to different aspects or not, is contemplated to implement and practice the invention. Furthermore, although aspects of this disclosure may achieve advantages over other possible solutions and/or over the prior art, whether or not a particular advantage is achieved by a given aspect is not limiting of the invention. Thus, the foregoing aspects, features, and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware configuration, an entirely software configuration (including firmware, resident software, micro-code, etc.) or a configuration combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of this disclosure are described with reference to flowchart illustrations and/or block diagrams of methods, apparatus (systems) and computer program products according to aspects of this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Aspects of this disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to aspects of the present disclosure, other and further aspects may be devised without departing from the basic scope thereof, and the scope thereof is determined by the claims that follow.

What is claimed is:

1. A computer-implemented method of simulating and rendering a visual depiction of a system, comprising:
   simulating the system, wherein the system includes at least one material, and wherein simulating the system comprises, for each of one or more iterations:
   transferring system information including angular momentum information from particles to a grid on which dynamics are computed, and
   transferring the system information including the angular momentum information and velocity information back from the grid to the particles on which at least velocity changes are computed,
   wherein the transfer from the particles to the grid and the transfer back from the grid to the particles act as filters and conserve angular momentum; and
   rendering for display one or more images depicting the system including the at least one material based, at least in part, on the simulation of the system.

2. The method of claim 1, wherein:
   the system information that is transferred from the particles to the grid and back from the grid to the particles further includes shearing information; and
   the transfer from the particles to the grid and the transfer back from the grid to the particles also preserve shearing modes.

3. The method of claim 2, wherein:
   the dynamics computed on the grid include at least one of forces, collision responses, and incompressible projections;
   at least the velocity changes and angular momentum changes are computed on the particles; and
   the particles are advected.

4. The method of claim 2, wherein the angular momentum and the shearing information are stored in a matrix.

5. The method of claim 2, wherein:
   the system includes a fluid; and
   the system information is transferred from the particles to marker-and-cell (MAC) faces of the grid.

6. The method of claim 2, wherein:
   the system includes a solid; and
   the one or more iterations are iterations in a material-point-method (MPM) loop.

7. The method of claim 2, further comprising, blending the simulation of the system with a particle-in-cell (PIC) simulation technique.

8. The method of claim 2, wherein:
   the system includes a plurality of materials; and
   the simulation is a coupled simulation of the plurality of materials.

9. The method of claim 2, wherein the dynamics computed on the grid include mesh-based Lagrangian forces.

10. A non-transitory computer-readable storage medium storing a program, which, when executed by a processor performs operations for simulating and rendering a visual depiction of a system, the operations comprising:
    simulating the system, wherein the system includes at least one material, and wherein simulating the system comprises, for each of one or more iterations:
    transferring system information including angular momentum information from particles to a grid on which dynamics are computed, and
    transferring the system information including the angular momentum information and velocity information back from the grid to the particles on which at least velocity changes are computed,
    wherein the transfer from the particles to the grid and the transfer back from the grid to the particles act as filters and conserve angular momentum; and rendering for display one or more images depicting the system including the at least one material based, at least in part, on the simulation of the system.

11. The computer-readable storage medium of claim 10, wherein:
the system information that is transferred from the particles to the grid and back from the grid to the particles further includes shearing information; and
the transfer from the particles to the grid and the transfer back from the grid to the particles also preserve shearing modes.

12. The computer-readable storage medium of claim 11, wherein:
the dynamics computed on the grid include at least one of forces, collision responses, and incompressible projections;
at least the velocity changes and angular momentum changes are computed on the particles; and
the particles are advected.

13. The computer-readable storage medium of claim 11, wherein the angular momentum and the shearing information are stored in a matrix.

14. The computer-readable storage medium of claim 11, wherein:
the system includes a fluid; and
the system information is transferred from the particles to marker-and-cell (MAC) faces of the grid.

15. The computer-readable storage medium of claim 11, wherein:
the system includes a solid; and
the one or more iterations are iterations in a material-point-method (MPM) loop.

16. The computer-readable storage medium of claim 11, the operations further comprising, blending the simulation of the system with a particle-in-cell (PIC) simulation technique.

17. The computer-readable storage medium of claim 11, wherein:
the system includes a plurality of materials; and
the simulation is a coupled simulation of the plurality of materials.

18. The computer-readable storage medium of claim 11, wherein the dynamics computed on the grid include mesh-based Lagrangian forces.

19. A system, comprising:
a processor; and
a memory, wherein the memory includes a program configured to perform operations for simulating and rendering a visual depiction of a system, the operations comprising:
simulating the system, wherein the system includes at least one material, and wherein simulating the system comprises, for each of one or more iterations:
transferring system information including angular momentum information from particles to a grid on which dynamics are computed; and
transferring the system information including the angular momentum information and velocity information back from the grid to the particles on which at least velocity changes are computed,
wherein the transfer from the particles to the grid and the transfer back from the grid to the particles act as filters and conserve angular momentum, and
rendering for display one or more images depicting the system including the at least one material based, at least in part, on the simulation of the system.

20. The system of claim 19, wherein:
the system information that is transferred from the particles to the grid and back from the grid to the particles further includes shearing information; and
the transfer from the particles to the grid and the transfer back from the grid to the particles also preserve shearing modes.

* * * * *

UNITED STATES PATENT AND TRADEMARK OFFICE
CERTIFICATE OF CORRECTION

PATENT NO. : 10,503,845 B2
APPLICATION NO. : 14/981309
DATED : December 10, 2019
INVENTOR(S) : Alexey Stomakhin et al.

It is certified that error appears in the above-identified patent and that said Letters Patent is hereby corrected as shown below:

On the Title Page

On the page 2, in Column 1, under "Other Publications", Line 10, delete "136:1-139:1." and insert -- 136:1-136:9. --, therefor.

On the page 2, in Column 1, under "Other Publications", Lines 23-24, delete "particle-based fluid"," and insert -- fluid simulation", --, therefor.

On the page 2, in Column 1, under "Other Publications", Line 25, after "HONG," delete "W.".

On the page 2, in Column 1, under "Other Publications", Line 32, before "Anim,2007," insert -- Comp --.

On the page 2, in Column 2, under "Other Publications", Line 36, delete "Eurographoics" and insert -- Eurographics --, therefor.

On the page 2, in Column 2, under "Other Publications", Line 48, delete "the the" and insert -- the --, therefor.

On the page 2, in Column 2, under "Other Publications", Line 60, delete "Hydrodymanics"" and insert -- Hydrodynamics" --, therefor.

In the Specification

In Column 1, Line 16, delete "Lagriangian/Eulerian" and insert -- Lagrangian/Eulerian --, therefor.

In Column 4, Line 54, delete "$L_{tot}^{P,n}=\Sigma_p^n \times m_p v_p^n, L_{tot}^{G,n}=\Sigma_i x_i \times m_i^n v_i^n.$" and Signed and Sealed this
Ninth Day of June, 2020

Andrei Iancu
*Director of the United States Patent and Trademark Office* insert -- $\mathbf{L}_{tot}^{P,n} = \sum_p \mathbf{x}_p^n \times m_p \mathbf{v}_p^n, \quad \mathbf{L}_{tot}^{G,n} = \sum_i \mathbf{x}_i \times m_i^n \mathbf{v}_i^n.$ --, therefor.

In Column 5, Line 19, delete "Lion" and insert -- $L_p^n$ on --, therefor.

In Column 6, Lines 50-55, delete " $\partial f_p = \sum_q \dfrac{\partial f_p}{\partial x_p} \partial u_q$ " and insert -- $\delta \mathbf{f}_p = \sum_q \dfrac{\partial \mathbf{f}_p}{\partial \mathbf{x}_q} \delta \mathbf{u}_q$ --, therefor.